United States Patent
Vijayrao

(10) Patent No.: US 11,281,615 B2
(45) Date of Patent: *Mar. 22, 2022

(54) APPARATUS, SYSTEM, AND METHOD FOR PERFORMING HARDWARE ACCELERATION VIA EXPANSION CARDS

(71) Applicant: Meta Platforms, Inc., Menlo Park, CA (US)

(72) Inventor: Narsing Krishna Vijayrao, Santa Clara, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/075,732

(22) Filed: Oct. 21, 2020

(65) Prior Publication Data

US 2021/0056066 A1 Feb. 25, 2021

Related U.S. Application Data

(63) Continuation of application No. 15/631,861, filed on Jun. 23, 2017, now Pat. No. 10,838,902.

(51) Int. Cl.
*G06F 13/40* (2006.01)
*G06F 13/42* (2006.01)
(Continued)

(52) U.S. Cl.
CPC .......... *G06F 13/4068* (2013.01); *G06F 1/185* (2013.01); *G06F 1/186* (2013.01);
(Continued)

(58) Field of Classification Search
None
See application file for complete search history.

(56) References Cited

U.S. PATENT DOCUMENTS

| 7,595,569 B2 | 9/2009 | Amerom et al. |
| 7,710,741 B1 | 5/2010 | Kelleher et al. |

(Continued)

FOREIGN PATENT DOCUMENTS

| CN | 102138175 A | 7/2011 |
| CN | 102176198 A | 9/2011 |

(Continued)

OTHER PUBLICATIONS

Non Final Office Action received for U.S. Appl. No. 15/631,861 dated Nov. 2, 2018, 22 pages.

(Continued)

*Primary Examiner* — Elias Mamo
(74) *Attorney, Agent, or Firm* — FisherBroyles, LLP

(57) ABSTRACT

An expansion card may include a printed circuit board and a hardware accelerator that is disposed on the printed circuit board. The hardware accelerator may include application-specific hardware circuitry designed to perform a computing task. The hardware accelerator may also offload a portion of the computing task from a central processing unit of a computing device by executing, via the application-specific hardware circuitry, the portion of the computing task. The expansion card may further include an edge connector, disposed on the printed circuit board, that is dimensioned to be inserted into an expansion socket of the computing device. The edge connector may couple the hardware accelerator to the central processing unit via a computing bus connected to the expansion socket. The edge socket may also include a pinout that is more compact than a pinout specification defined for the computing bus. Various other apparatuses, systems, and methods are also disclosed.

20 Claims, 14 Drawing Sheets

(51) Int. Cl.
   *G06F 1/3296* (2019.01)
   *G06F 15/00* (2006.01)
   *G06F 1/18* (2006.01)
   *G06F 13/38* (2006.01)

(52) U.S. Cl.
   CPC .......... *G06F 1/3296* (2013.01); *G06F 13/385* (2013.01); *G06F 13/4022* (2013.01); *G06F 13/4282* (2013.01); *G06F 15/00* (2013.01); *G06F 2213/0032* (2013.01)

(56) References Cited

U.S. PATENT DOCUMENTS

| | | | |
|---|---|---|---|
| 8,572,614 B2 | 10/2013 | Krishnamurthy | |
| 9,818,456 B1* | 11/2017 | Wu | H05K 7/1427 |
| 10,477,707 B1* | 11/2019 | Petersen | H05K 7/1489 |
| 10,488,893 B1* | 11/2019 | Keilers | G06F 1/189 |
| 10,729,030 B1* | 7/2020 | Cousineau | H05K 3/3405 |
| 10,838,902 B2 | 11/2020 | Vijayrao | |
| 11,073,873 B1* | 7/2021 | Sover | G06F 1/186 |
| 2010/0076915 A1 | 3/2010 | Xu et al. | |
| 2011/0066832 A1 | 3/2011 | Casselman et al. | |
| 2012/0084665 A1 | 4/2012 | Bookstaff | |
| 2012/0092040 A1 | 4/2012 | Xu et al. | |
| 2012/0221181 A1 | 8/2012 | Rosener | |
| 2013/0111229 A1 | 5/2013 | Borland et al. | |
| 2014/0192073 A1 | 7/2014 | Gorchetchnikov et al. | |
| 2014/0201303 A1 | 7/2014 | Dalal et al. | |
| 2015/0277935 A1 | 10/2015 | Desimone et al. | |
| 2015/0294434 A1 | 10/2015 | Nataros | |
| 2016/0364271 A1 | 12/2016 | Burger et al. | |
| 2017/0139629 A1 | 5/2017 | Van Lunteren | |
| 2017/0308499 A1 | 10/2017 | Sardaryan et al. | |
| 2018/0081804 A1 | 3/2018 | Turner et al. | |
| 2018/0373664 A1 | 12/2018 | Vijayrao | |
| 2019/0391944 A1* | 12/2019 | Seiler | G06F 13/385 |

FOREIGN PATENT DOCUMENTS

| | | | |
|---|---|---|---|
| CN | 105122727 A | 12/2015 | |
| CN | 106649345 A | 5/2017 | |
| CN | 106776461 A | 5/2017 | |
| CN | 111052887 A | 4/2020 | |
| CN | 112905513 A | 6/2021 | |
| EP | 3 418 901 A1 | 12/2018 | |
| JP | 2020529647 A | 10/2020 | |
| KR | 20200011548 A | 2/2020 | |
| WO | 2016/200844 A1 | 12/2016 | |
| WO | 2018/236408 A1 | 12/2018 | |

OTHER PUBLICATIONS

Non Final Office Action received for U.S. Appl. No. 15/631,861 dated May 31, 2019, 11 pages.
Final Office Action received for U.S. Appl. No. 15/631,861 dated Oct. 7, 2019, 17 pages.
Non Final Office Action received for U.S. Appl. No. 15/631,861 dated Mar. 19, 2020, 13 pages.
Notice of Allowance received for U.S. Appl. No. 15/631,861 dated Jul. 13, 2020, 22 pages.
Wikipedia, "Pinout", URL: https://en.wikipedia.org/w/index.php?title=Pinout&oldid=780226921, as accessed on Aug. 3, 2017, 4 pages.
Wikipedia, "M.2", URL: https://en.wikipedia.org/w/index.php?title=M.2&oldid=785692082, as accessed on Aug. 3, 2017, 5 pages.
Wikipedia, "Edge connector", URL: https://en.wiki pedia.org/w/index.php ?title=Edge_connector&oldid=736591535, as accessed on Aug. 3, 2017, 2 pages.
International Search Report with Written opinion received for PCT Application Serial No. PCT/US2017/049276 dated Feb. 20, 2018, 17 pages.
International Preliminary Report on Patentability received for PCT Application Serial No. PCT/US2017/049276 dated Jan. 2, 2020, 13 pages.
Extended European Search Report received for European Patent Application Serial No. 17195956.2 dated May 7, 2018, 7 pages.
First Office Action received for Chinese Patent Application Serial No. 201780094104.5 dated Aug. 5, 2020, 34 pages (Including English Translation).
Communication pursuant to Article 94(3) EPC received for EP Patent Application Serial No. 17195956.2 dated May 14, 2021, 10 pages.
Nvidia, "MXM Graphics Module Mobile PCI Express Module Electromechanical Specification Version 3.1", URL: https://www.module-store.de/media/pdf/d9/a4/43/MXM_Specification_v31_r10.pdf, Mar. 1, 2012, 10 pages.
Notice of Reasons for Rejection received for Japanese Patent Application Serial No. 2019-570396 dated Apr. 27, 2021, 10 pages (Including English Translation).
DeLock, "The M.2 interface", URL: https://www.delock.de/infothek/M.2/M.2_e.html, Feb. 2017, pp. 2-11.
Decision of Rejection dated Sep. 7, 2021 for Japanese Application No. 2019-570396, filed Aug. 30, 2017, 15 Pages.
Examination Report dated Feb. 4, 2022 for Indian Application No. 202017000357, filed Jan. 4, 2020, 5 pages.
Notice of Preliminary Rejection dated Nov. 23, 2021 for Korean Application No. 10-2020-7000889, filed Aug. 30, 2017, 14 pages.

* cited by examiner

APPARATUS, SYSTEM, AND METHOD FOR PERFORMING HARDWARE ACCELERATION VIA EXPANSION CARDS

CROSS-REFERENCE TO RELATED APPLICATIONS

This application claims the benefit, as a continuation application, of parent application Ser. No. 15/631,861, filed 23 Jun. 2017, which is incorporated herein in its entirety.

BACKGROUND

The demand for handling complex computational tasks (such as video transcoding and artificial intelligence operations, among others) is expanding at an ever-increasing rate. Complex computational tasks are often assigned to powerful data center servers (e.g., domain controllers) since other devices (e.g., edge servers) may lack the computing resources necessary to effectively complete these demanding tasks. However, deploying and maintaining domain controllers may be expensive, and adding domain controllers to scale a data center for high-demand computing tasks may be inefficient and/or impractical, especially in high-growth points-of-presence (POPS) traditionally serviced by edge servers. Moreover, due to their general-purpose design, domain controllers may struggle with and/or inefficiently handle some highly specific and demanding tasks. Thus, traditional data center resources and scaling techniques may be unable to efficiently and effectively keep pace with the ever-increasing demand for computationally intensive tasks.

SUMMARY

As will be described in greater detail below, the instant disclosure presents various apparatuses, systems, and methods for effectively and efficiently handling complex computational tasks by hardware accelerating the same using compact expansion cards. In one example, such an expansion card may include a printed circuit board and a hardware accelerator. The hardware accelerator may be disposed on the printed circuit board and may include application-specific hardware circuitry designed to perform a computing task. The hardware accelerator may offload at least a portion of the computing task from a central processing unit of a computing device by executing, via the application-specific hardware circuitry, at least a portion of the computing task. The expansion card may also include an edge connector, disposed on the printed circuit board, that is dimensioned to be inserted into an expansion socket of the computing device. The edge connector may couple the hardware accelerator to the central processing unit via a computing bus connected to the expansion socket. The edge connector may also include a pinout that is more compact than a pinout specification defined for the computing bus.

In some examples, the pinout of the edge connector may conform to an M.2 pinout specification, a U.2 pinout specification, and/or an mSATA pinout specification. In additional or alternative examples, the hardware accelerator may include a field-programmable gate array and/or an application-specific integrated circuit.

In some embodiments, the expansion card may further include a voltage regulator that stabilizes voltage received via the expansion socket and supplies the stabilized voltage to the hardware accelerator. In one example, the computing task that the application-specific hardware circuitry is designed to perform may include an artificial intelligence inference task that applies a model trained on known data to infer at least one label for new data. In additional or alternative examples, the computing task that the application-specific hardware circuitry is designed to perform may include a video transcoding task.

Similarly, a system incorporating the above-described apparatus may include a central processing unit, a memory device, an expansion socket, and an expansion card. The expansion card may include a printed circuit board and a hardware accelerator that is disposed on the printed circuit board. In one example, the hardware accelerator may include application-specific hardware circuitry designed to perform a computing task. In this example, the hardware accelerator may offload at least a portion of the computing task from the central processing unit by executing, via the application-specific hardware circuitry, at least a portion of the computing task. The expansion card may also include an edge connector, disposed on the printed circuit board, that is dimensioned to be inserted into the expansion socket. The edge connector may couple the hardware accelerator to the central processing unit via a computing bus connected to the expansion socket. The edge connector may also include a pinout that is more compact than a pinout specification defined for the computing bus.

In some examples, the expansion socket may be disposed on an intermediary expansion card that includes a pinout that conforms to the pinout specification defined for the computing bus. In further examples, the system may include a chassis that is dimensioned to accept a plurality of modular computing devices. In these examples, the expansion socket may be disposed on a modular computing device inserted into the chassis. Additionally or alternatively, the system may include a chassis that is dimensioned to accept a plurality of modular storage devices. In these examples, the expansion socket may be disposed on a modular storage device inserted into the chassis.

In some embodiments, the system may represent a domain controller server and/or or an edge server. In embodiments where the system represents an edge server, offloading at least a portion of the computing task from the central processing unit of the edge server may enable the edge server to perform the computing task.

In some examples, the system may represent a backend data center of a corporate networking enterprise that provides at least one online service to corresponding users of client devices. The online service may, for example, represent a social networking service, a virtual reality service, and/or a cloud storage service.

A corresponding method may include inserting an expansion card into an expansion socket of a computing device. The expansion card may include a printed circuit board and a hardware accelerator that is disposed on the printed circuit board. The hardware accelerator may include application-specific hardware circuitry designed to perform a computing task. The expansion card may also include an edge connector, disposed on the printed circuit board, that is dimensioned to be inserted into the expansion socket of the computing device. The edge connector may couple the hardware accelerator to a central processing unit of the computing device via a computing bus connected to the expansion socket. The edge connector may also include a pinout that is more compact than a pinout specification defined for the computing bus. In addition, the method may include offloading at least a portion of the computing task from the central processing unit by executing, via the application-specific hardware circuitry, at least a portion of the computing task.

In some examples, the method may further include scaling the hardware acceleration capabilities of the computing device by inserting an additional expansion card into an additional expansion socket of the computing device. The additional expansion card may include at least one additional hardware accelerator that includes additional application-specific hardware circuitry designed to perform the computing task. The additional expansion card may also include an additional edge connector that includes an additional pinout that is more compact than the pinout specification defined for the computing bus. In additional examples, inserting the expansion card into the expansion socket may include inserting the expansion card into a socket of an intermediary expansion card that is inserted into the expansion socket of the computing device. In these examples, the intermediary expansion card may include a pinout that conforms to the pinout specification defined for the computing bus.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
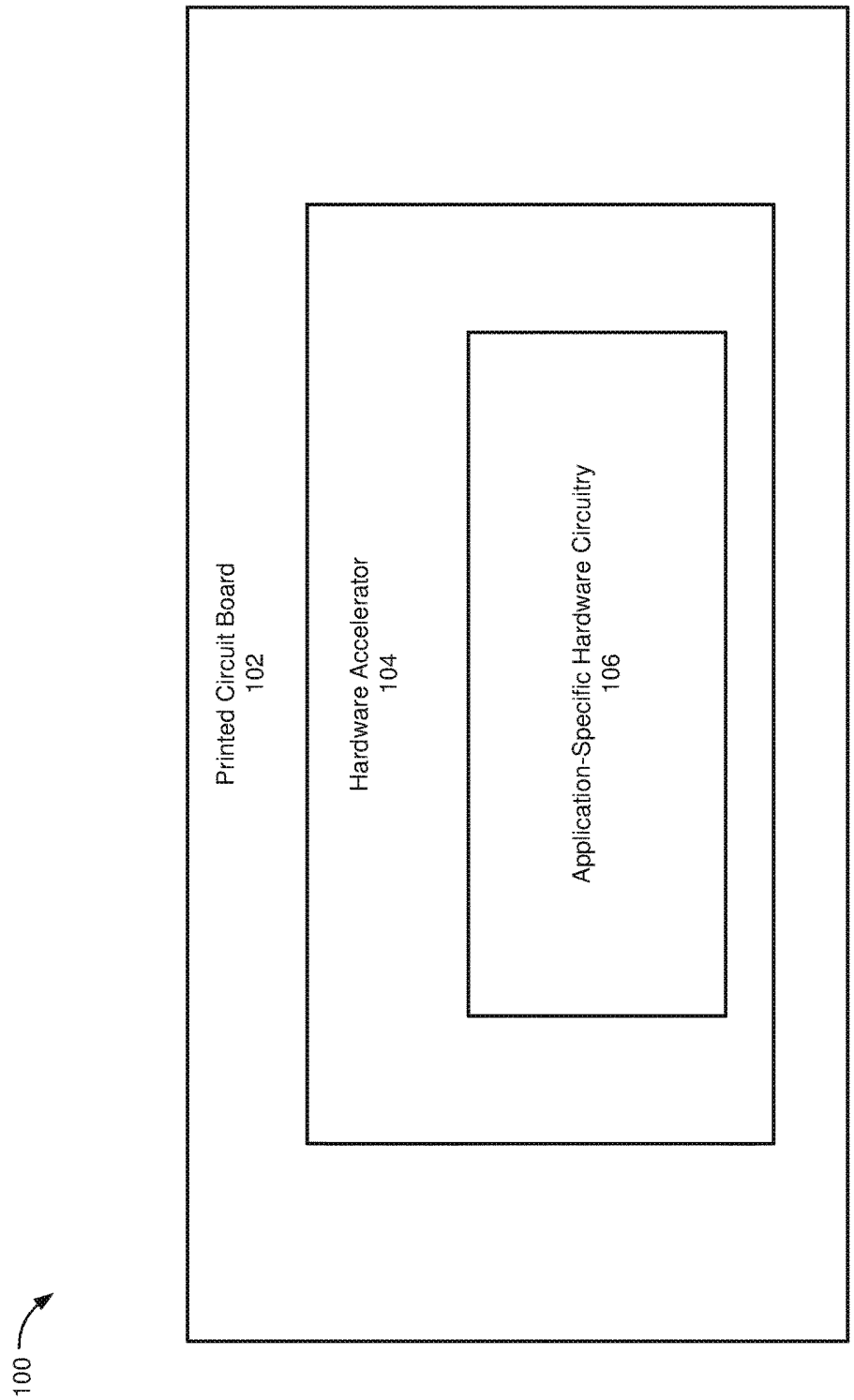
FIG. 1 is a block diagram of an example expansion card capable of performing hardware acceleration.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure describes various apparatuses, systems, and methods for performing hardware acceleration via expansion cards. As will be explained in greater detail below, the devices disclosed herein may enable efficient, effective, and scalable hardware acceleration by coupling hardware accelerators to compact expansion cards (e.g., expansion cards such as M.2, U.2, and mSATA cards, whose pinouts are more compact than pinout specifications defined for the buses they use).

While compact expansion cards have traditionally been used for storage and wireless communications, repurposing compact cards for hardware acceleration may provide various advantages over traditional hardware acceleration solutions. For example, by offloading specific, complex computational tasks to hardware accelerators on expansion cards, the disclosed systems may reduce the computational demand on more expensive devices (such as domain controllers), potentially resulting in monetary and/or power savings. The disclosed systems and methods may also enable lightweight devices (such as edge servers) in various points-of-presence to perform computing tasks that they would otherwise lack the computing resources to handle. In addition, due to their application-specific design, the disclosed hardware accelerators may perform such tasks more effectively and/or efficiently than general-purpose computing devices. Finally, the disclosed expansion cards (and their hardware accelerators) may be quickly and easily deployed and granularly scaled across an entire computing ecosystem, thereby enabling technology companies to efficiently and effectively keep pace with the ever-increasing demand of computationally intensive tasks.

The following will provide, with reference to FIGS. 1-4, examples of an expansion card (and various pinout specifications that enable a compact footprint for the same) that is capable of performing hardware acceleration. Additionally, the description corresponding to FIGS. 5A-5C and FIGS. 10A-10B will provide an overview of exemplary techniques for inserting and/or removing such expansion cards into corresponding expansion sockets. The description corresponding to FIGS. 6-10 will illustrate the scalability of these expansion cards, while the description corresponding to FIG. 11 will describe an exemplary workflow for adding hardware acceleration capabilities to a computing device using one or more of the example expansion cards illustrated in previous figures.

FIG. 1 is a block diagram of an example expansion card 100 capable of performing hardware acceleration according to the systems and methods disclosed herein. As shown in this figure, expansion card 100 may include a printed circuit board 102 and one or more components disposed on printed circuit board 102. As used herein, the term "expansion card" generally refers to a card, such as a card substantially formed by a printed circuit board, that is configured for insertion into a corresponding computing device or expansion socket to thereby expand the functionality of the computing device.

As shown in FIG. 1, expansion card 100 may include a hardware accelerator 104 disposed on printed circuit board 102. The term "hardware accelerator," as used herein, generally refers to a hardware component or device that performs one or more specialized computing tasks more efficiently, in hardware, than the computing task would be performed in software by a general purpose central processing unit (i.e., a computing chip that is structured to execute a range of different programs as software). In some examples, "hardware acceleration" may refer to the execution of a computing task in application-specific hardware circuitry that occurs in the absence of a software module intermediary or other layer of abstraction, such that the performance of the application is more efficient than when executed otherwise.

In one example, hardware accelerator 104 may include application-specific hardware circuitry 106 designed to perform a specific computing task. In this example, hardware accelerator 104 may be designed to offload a portion of the specific computing task from a central processing unit of a computing device, such as a data center server, by executing, via application-specific hardware circuitry 106, at least a portion of the specific computing task. The phrase "offload a portion of the computing task from a central processing unit of a computing device," as used herein, may generally refer to performing the computing task through the hardware accelerator rather than performing the computing task through a general purpose central processing unit (i.e., a central processing unit of the computing device to which expansion card 100 is coupled, or another central processing unit that might otherwise perform the computing task in the absence of expansion card 100).

Although not illustrated in the block diagram of FIG. 1, expansion card 100 may also include an edge connector (such as edge connector 110 in FIG. 4), disposed on printed circuit board 102, that is dimensioned to be inserted into an expansion socket of a computing device. In one example, the edge connector may couple hardware accelerator 104 to the central processing unit of the computing device via a computing bus connected to the expansion socket.

The term "edge connector," as used herein, generally refers to one or more connections at an edge of an expansion card that couple the expansion card to a corresponding computing bus or computing device. In some examples, this edge connector may be formed of a portion of a printed circuit board, such as printed circuit board 102. In addition, this edge connector may include traces (i.e., pins) on the printed circuit board leading to the edge of the board, which may be designed or configured to be plugged into a matching socket. In general, the edge connector may include a male connector that matches a corresponding female connector or socket at a computing device (e.g., on the computing device motherboard).

In some examples, the edge connector may be keyed to ensure a correct polarity. The connectors may also contain bumps or notches both for polarity and to ensure that the wrong type of device is not inserted into an expansion socket. In some examples, in addition to having the correct keying, the edge connector may have a width and thickness designed to fit into the expansion socket.

As noted above, and as will be described in greater detail below, the edge connector may include a compact pinout that is more compact than a pinout specification defined for the computing bus to which the expansion card (and, in turn, its hardware accelerator) is coupled. The term "pinout," as used herein, generally refers to a cross-reference between the contacts, or pins, of an electrical connector or electronic component, such as expansion card 100, as well as the functions of these contacts or pins. A compact pinout may be more compact than at least one other specified pinout by having a narrower, thinner, or otherwise smaller width dimension than the other pinout, having a narrower, thinner, or otherwise smaller thickness dimension than the other pinout, having closer pin pitch than the other pinout, having narrower, thinner, or smaller pins than the other pinout, and/or by being smaller than the other pinout in any other manner or dimension.

As example of a compact pinout is the pinout for M.2 cards. M.2 cards may have a set of 75 pin spaces, and this set of pin space may be 12 mm, 16 mm, 22 mm, or 30 mm wide. The pins may also have a length of 2.00 mm and a pitch of 0.5 mm. In contrast, the specification for a native PCI EXPRESS x1 pinout may define a pitch of at least 1.0 mm, a width of at least 35 mm, and a length of at least 2.3 mm. Thus, an M.2 pinout, which may connect to a PCI EXPRESS bus, may be said to be more compact than a pinout defined by a specification for the PCI EXPRESS bus since at least one dimension of the M.2 pinout is smaller than the pinout defined by the specification for the PCI EXPRESS bus.

In one example, the edge connector of expansion card 100 may have a pinout that conforms to one or more mixed-pin pinout specifications. As used herein, the term "mixed-pin" generally refers to an expansion card having a pinout that differs from a pinout of the specification of a computing bus to which the expansion card couples. In some examples, the expansion card may successfully couple with the computing bus, despite the conflict between the two pinouts, because the corresponding expansion socket may include one or more items of intermediary circuitry that effectively couples connections and/or translates data from the expansion card pinout into a format accepted by the computing bus, and vice versa. Illustrative examples of mixed-pin specifications to which the pinout of the edge connector may conform include an M.2 pinout specification, a U.2 pinout specification, and/or an mSATA pinout specification.

As detailed above, hardware accelerator 104 of expansion card 100 may be customized or special-purpose designed to perform, in hardware, one or more specific computing tasks. Illustrative examples of the types of specific computing tasks or applications that hardware accelerator 104 of expansion card 100 may execute or perform include, without limitation, artificial intelligence and/or machine learning training (e.g., model construction, inference, flasher labeling, etc.), video transcoding (e.g., converting video data from one encoded format to an intermediate uncompressed format and then converting the intermediate uncompressed format to another encoded format or target format), video processing (e.g., combining two or more video streams into a single video stream or a fewer number of video streams), data encryption/decryption, data compression/decompression, etc. In some examples, hardware accelerator 104 of expansion card 100 may be especially suited to, or beneficial for, the performance of specific types of mathematical operations, which may include multiply-accumulate operations, linear algebra operations, machine learning or vector tuning operations, and/or cryptographic prime number identification and/or verification operations. In general, hardware accelerator 104 of expansion card 100 may be customized or special-purpose designed to perform, in hardware, any type or form of computation-intensive computing task to thereby alleviate the burden on one or more general-purpose central processing units (i.e., by performing the computing task on a separate chip than the central processing unit and/or by performing the computing task more efficiently in hardware than in software).

As indicated above, in some examples, the computing task that application-specific hardware circuitry 106 of hardware accelerator 104 is designed to perform may include an artificial intelligence inference task that applies a model trained on known data to infer at least one label for new data. As used herein, the phrase "artificial intelligence inference task that applies a model trained on known data" generally refers to the process of applying a trained model rather than the process of generating, training, and/or tuning the model. In some examples, hardware accelerator 104 of expansion card 100 may effectively label one or more items of newly encountered, or newly analyzed, data with a label or attribute. In general, the model may be generated, trained, and/or tuned based on previously encountered data that was partially, or entirely, labeled, thereby enabling a machine learning algorithm to predict one or more labels for future data (e.g., by detecting patterns in the labels of the previously encountered data).

In some embodiments, the artificial intelligence inference task may include a user attribute inference task in the context of an online social networking system. In these examples, the user attribute may include an interest, a recommendation (e.g., an advertisement recommendation and/or a friend recommendation), and/or a push notification (e.g., a social network post selected for the user's newsfeed). In general, the artificial intelligence inference task may identify one or more of these labels or attributes for a user based on one or more items of data and/or metadata for the user, including the user's post history, post content, social media "likes" or response icon selections, friends list, message history, message content, and/or selected or clicked items, including newsfeed items and/or advertisements. In general, the artificial intelligence inference task may infer, or predict, that a user with one set of data or metadata will tend to share a label with another user having a similar or identical set of data or metadata (e.g., the strength of the prediction may be proportional to the similarity between the two users' items of data/metadata).

Hardware accelerator 104 may take a variety of forms. Illustrative examples of hardware accelerators include, without limitation, graphics processing units, cryptographic accelerators, video processing units, artificial intelligence accelerators, coprocessors, digital signal processors, and/or public key encryption accelerators. In some examples, hardware accelerator 104 may be implemented via an application specific integrated circuit (ASIC) and/or a field-programmable gate array (FPGA).

Figure 2:
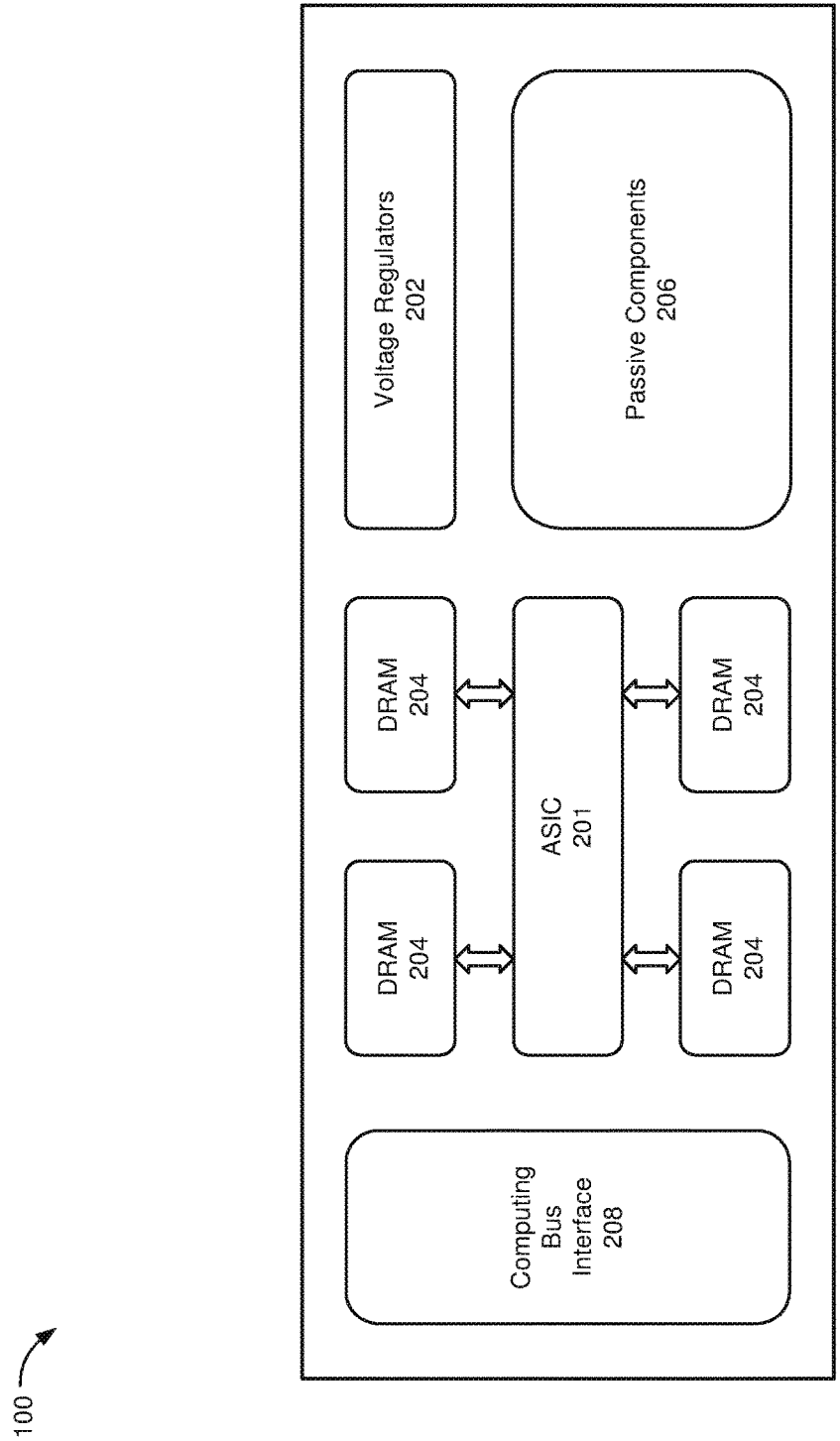
FIG. 2 is a more specific block diagram of an example expansion card capable of performing hardware acceleration.

FIG. 2 shows a block diagram of a more specific example of expansion card 100. As shown in this figure, expansion card 100 may include a hardware accelerator in the form of an ASIC 201. As further shown in this figure, expansion card 100 may include a variety of additional components, such as one or more voltage regulators 202 that may stabilize voltage received via a corresponding expansion socket of a computing device and supply the same to hardware accelerator 104. As shown in this figure, expansion card 100 may also include one or more instances of dynamic random-access memory (DRAM) 204, each of which may be coupled to hardware accelerator 104. Expansion card 100 may also include one or more passive components 206, including resistors, capacitors, inductors, and/or transistors. Additionally, or alternatively, expansion card 100 may also include one or more active components. Each of the passive components and/or active components may be specifically designed and/or placed on expansion card 100 in a configuration that executes or performs (and/or enables ASIC 201 to perform), in hardware, the specific application in question, such as the video transcoding and/or artificial intelligence inference tasks described above. Lastly, expansion card 100 may also include a computing bus interface 208, such as a PCI EXPRESS interface, which may translate data formatted by ASIC 201 for transmission across the edge connector and/or the computing bus to which expansion card 100 may be coupled.

Figure 3:
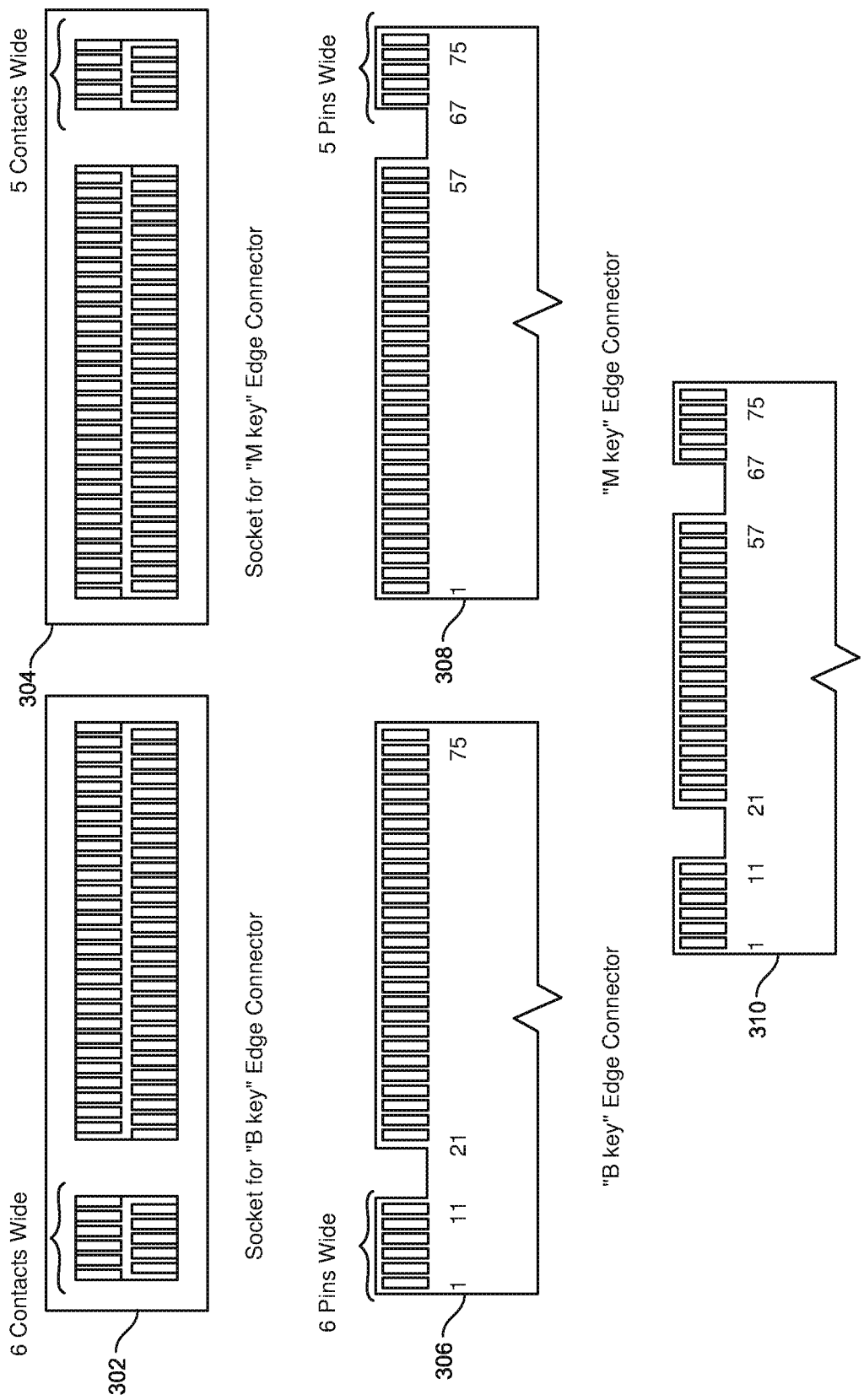
FIG. 3 is a set of block diagrams of various example pinouts that may be used by the expansion cards described herein.

As detailed above, the edge connector of expansion card 100 may have a pinout that conforms to one or more mixed-pin pinout specifications, such as the M.2 specification. FIG. 3 illustrates various examples of edge connector pinouts, conforming to the M.2 specification, that expansion card 100 may utilize. In this figure, elements 302 and 304 illustrate the pinouts for expansion sockets that conform to the "B key" and "M key" edge connector configurations of the M.2 specification. As such, in some embodiments, the edge connector 110 of expansion card 100 from FIG. 1 may include pinouts for "B key" and "M key" edge connectors, as illustrated by elements 306 and 308, which may fit within corresponding M.2 expansion sockets as male connectors. Alternatively, the edge connector 110 of expansion card 100 may include pinouts that conform to the "B & M key" hybrid edge connector configuration of the M.2 specification, as illustrated by element 310. As further discussed above, each of these example pinouts may be more compact than the pinout specified by the PCI EXPRESS computing bus specification to which an M.2 expansion card may be coupled and over which an M.2 expansion card may communicate.

Figure 4:
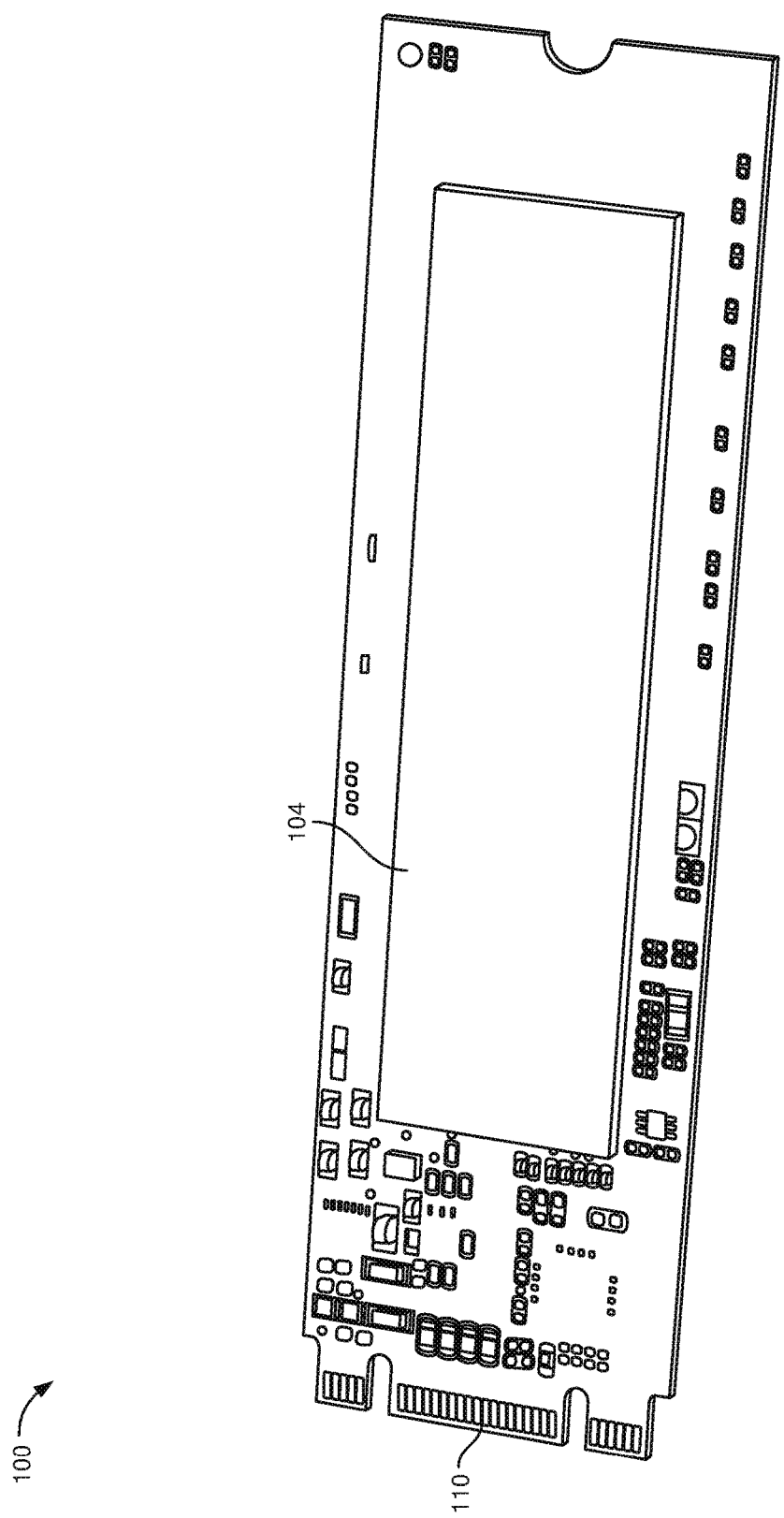
FIG. 4 is a perspective view of an example expansion card.

FIG. 4 is a perspective view of an example expansion card 100 that includes an edge connector 110 and a hardware accelerator 104. In one embodiment, expansion card 100 may be dimensioned to be inserted into a corresponding expansion socket (such as expansion socket 502 in FIGS. 5A-5C) that provides interfaces for a variety of computer buses, such as PCI EXPRESS 3.0 (up to, e.g., four lanes), SERIAL ATA 3.0, and USB 3.0 (with, e.g., a single logical port for each of the latter two), and/or any other suitable interface. In some examples, expansion card 100 may have keying notches (such as those illustrated in FIG. 3) that denote the various purposes and capabilities of expansion card 100 to prevent plugging expansion card 100 into feature-incompatible expansion sockets. For example, expansion card 100 may, when designed to conform to the M.2 specification, provide a 75-position edge connector dimensioned to be inserted into expansion sockets keyed for SATA or two PCI EXPRESS lanes (PCIe x2) (according to a "socket 2 configuration") or keyed for four PCI EXPRESS lanes (PCIe x4) (according to the "socket 3 configuration").

Expansion card 100 may also be dimensioned to be inserted into an expansion socket (such as an M.2 expansion socket) that, in addition to supporting legacy Advanced Host Controller Interface (AHCI) at the logical interface level, may also support NVM EXPRESS (NVMe) as a logical device interface. While the support for AHCI may ensure software-level backward compatibility with legacy SATA devices and legacy operating systems, NVM EXPRESS may also enable expansion card 100 to fully utilize the capability of high-speed PCI EXPRESS devices to perform many I/O operations in parallel.

Expansion card 100 may also be dimensioned to be inserted into an expansion socket that exposes a variety of computing buses, including PCI EXPRESS 3.0, Serial ATA (SATA) 3.0, and USB 3.0. As a result, expansion card 100 may, in some embodiments, integrate a variety of functions in addition to hardware acceleration, including the following device classes: WI-FI, BLUETOOTH, satellite navigation, NEAR FIELD COMMUNICATION (NFC), digital radio, WIRELESS GIGABIT (WiGig), wireless WAN (WWAN), and solid-state drives (SSDs).

In some examples, expansion card 100 may be dimensioned to be inserted into an expansion socket that provides up to four PCI EXPRESS lanes and one logical SATA 3.0 (6 Gbit/s) port, exposing the same through the same connector so that both PCI EXPRESS and SATA devices may exist on expansion card 100. By exposing PCI EXPRESS lanes in this manner, the expansion socket may provide a pure PCI EXPRESS connection between the host computing device and expansion card 100, with no additional layers of bus abstraction.

Expansion card 100 may be formed in a variety of shapes and sizes. In one example, expansion card 100 may be substantially rectangular in shape, with an edge connector 110 on one side and a semicircular mounting hole at the center of the opposite edge. Components may be mounted on either side of expansion card 100. In the specific example of FIG. 4, expansion card 100 may have a width of 22 mm and a length of 110 mm, which conforms to one of the size requirements of the M.2 specification. These dimensions are merely illustrative, however, and expansion card 100 may take the form of any suitable dimensions that conform to its corresponding expansion card specification, such as the M.2 specification mentioned above. For example, expansion card 100 may have a width of 12, 16, 22, or 30 mm, and a length of 16, 26, 30, 38, 42, 60, 80, or 110 mm, as defined by the M.2 specification.

The pinouts shown in FIGS. 3 and 4 are merely illustrative. The following table provides a more detailed overview of potential keying and provided interfaces that expansion card 100 may utilize:

| Key ID | ID Notched Pins | Provided Interfaces |
|--------|-----------------|---------------------|
| A | 8-15 | PCIe ×2, USB 2.0, I2C, and DP ×4 |
| B | 12-19 | PCIe ×2, SATA, USB 2.0, and 3.0, audio, UIM, HSIC, SSIC, I2C, and SMBus |
| C | 16-23 | Reserved for future use |
| D | 20-27 | Reserved for future use |
| E | 24-31 | PCIe ×2, USB 2.0, I2C, SDIO, UART, and PCM "WiFi/Bluetooth cards" |
| F | 28-35 | Future Memory Interface (FMI) |
| G | 39-46 | Reserved for custom use (unused in the M.2 specification) |
| H | 43-50 | Reserved for future use |
| J | 47-54 | Reserved for future use |
| K | 51-58 | Reserved for future use |
| L | 55-62 | Reserved for future use |
| M | 59-66 | PCIe ×4, SATA, and SMBus |

Additionally, the following table indicates potential component thicknesses for expansion card 100:

| Type ID | Top Side | Bottom Side |
|---------|----------|-------------|
| S1 | 1.20 mm | N/A |
| S2 | 1.35 mm | N/A |
| S3 | 1.50 mm | N/A |
| D1 | 1.20 mm | 1.35 mm |
| D2 | 1.35 mm | 1.35 mm |
| D3 | 1.50 mm | 1.35 mm |
| D4 | 1.50 mm | 0.70 mm |
| D5 | 1.50 mm | 1.50 mm |

Figure 5A:
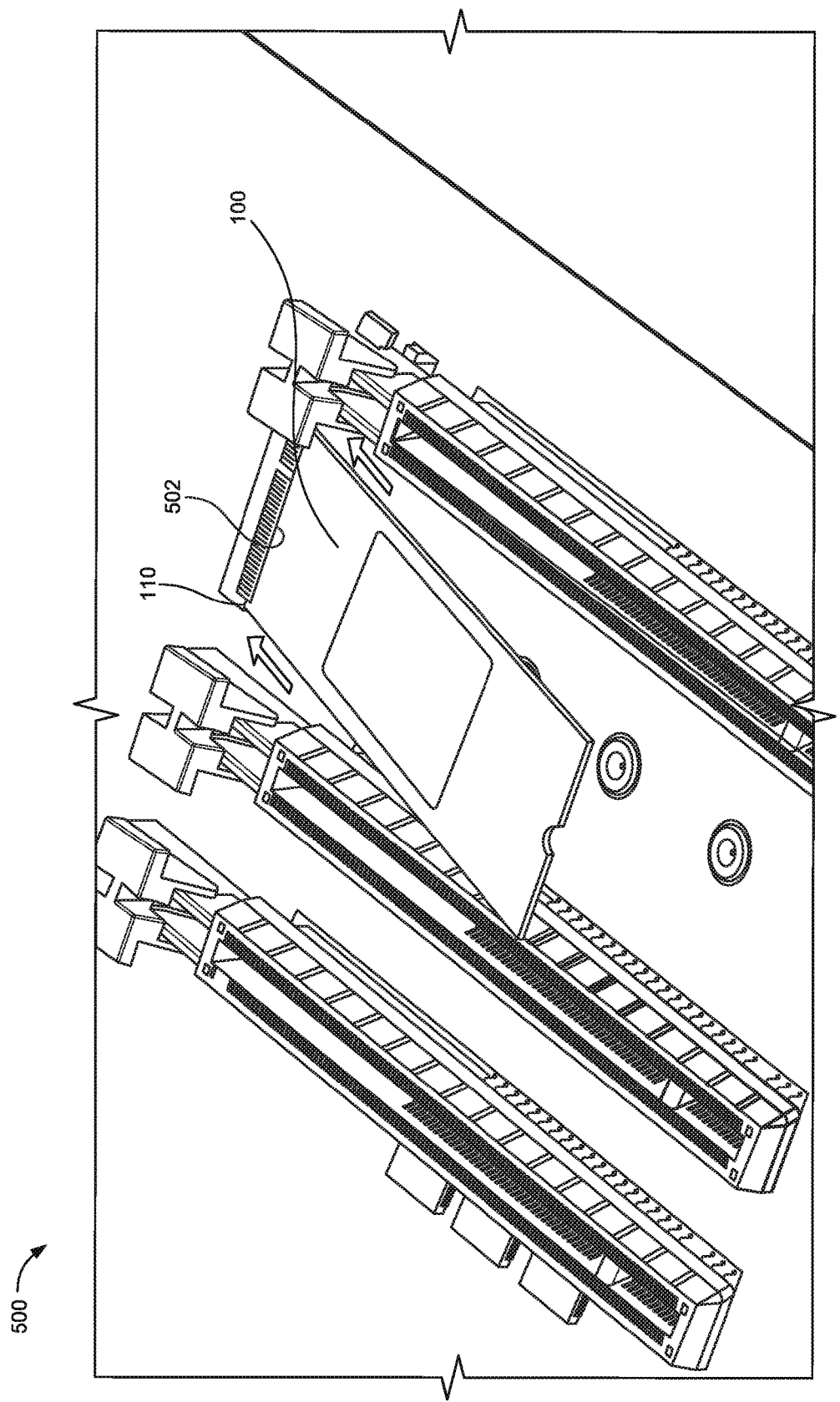
FIG. 5A is a perspective view of an initial stage of a process for inserting an example expansion card into a corresponding expansion socket.
Figure 5B:
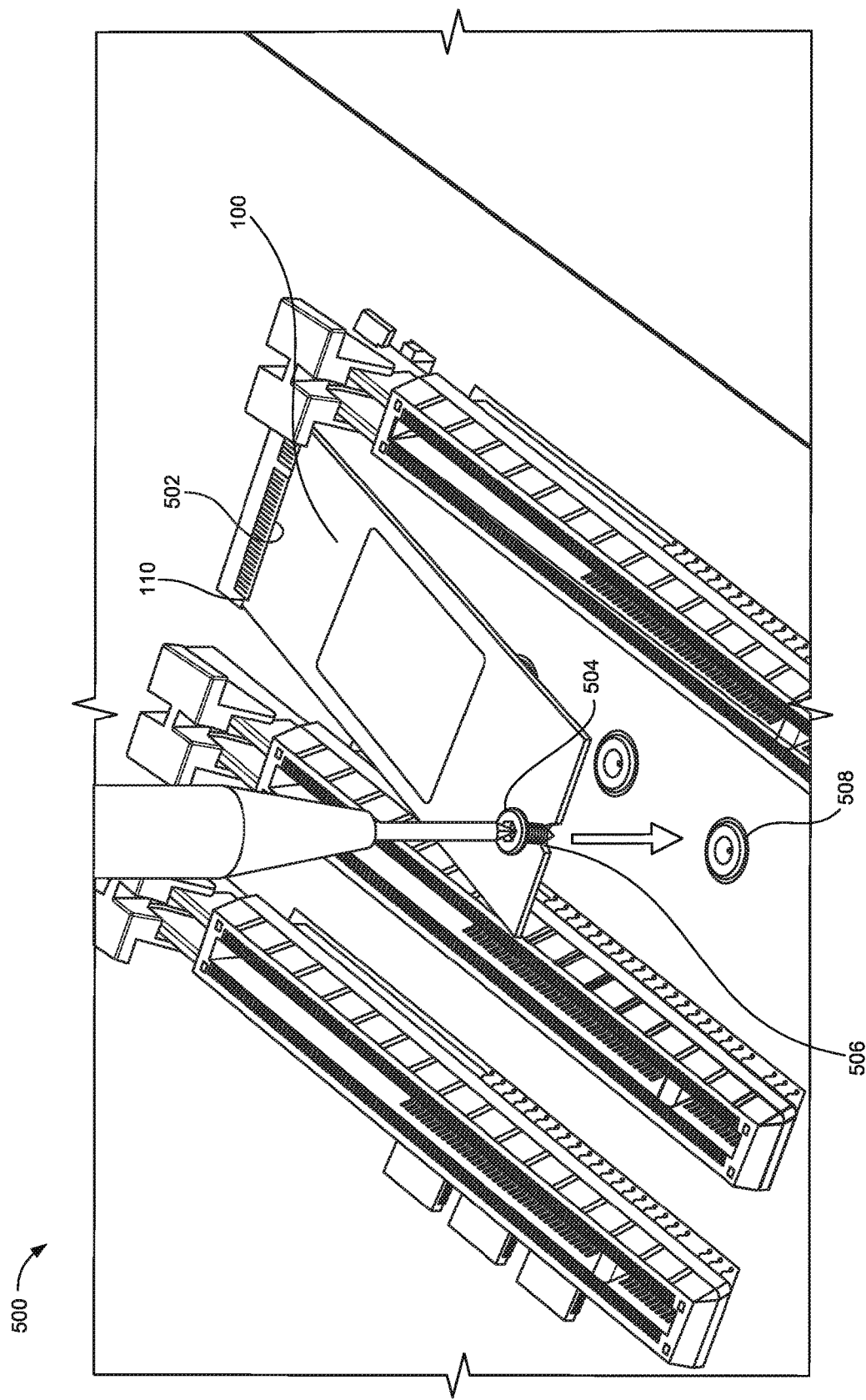
FIG. 5B is a perspective view of an intermediate stage of the process for inserting the example expansion card into the corresponding expansion socket.
Figure 5C:
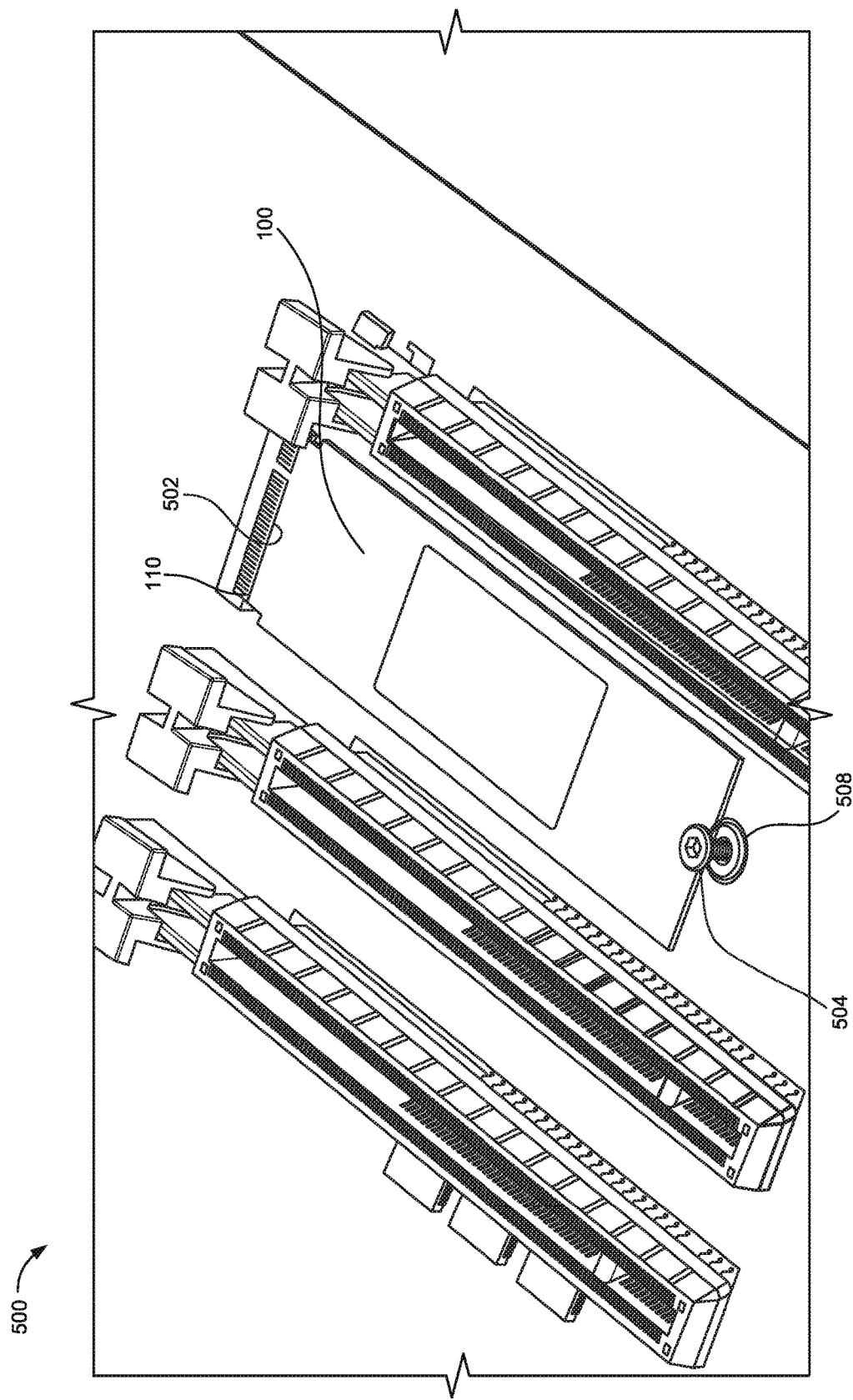
FIG. 5C is a perspective view of a concluding stage of the process for inserting the example expansion card into the corresponding expansion socket.

As detailed above, expansion card 100 may be dimensioned to be inserted into a corresponding expansion socket provided by a host circuit board. FIGS. 5A-5C illustrate three separate stages (i.e., beginning, middle, and ending) of a process for inserting, or coupling, an expansion card 100 with a corresponding expansion socket 502 on a motherboard 500. As shown in FIG. 5A, a user or machine may first align edge connector 110 of expansion card 100 with expansion socket 502. The user or machine may then push expansion card 100 such that edge connector 110 fits within expansion socket 502. Next, as shown in FIG. 5B, the user or machine may align a screw 504 with a corresponding hole or notch 506 located on expansion card 100 and then twist screw 504 through hole or notch 506 and into a corresponding screw hole 508 beside expansion socket 502, thereby fastening expansion card 100 into expansion socket 502. FIG. 5C illustrates an example of the final position of expansion card 100 after the fastening process is complete.

In some examples, expansion card 100 may constitute one part of a larger system. For example, expansion card 100 may be inserted into an expansion socket of a computing device that represents, either alone or in combination with other computing devices or components, part of a larger system. In some examples, this computing device may include a central processing unit. In these examples, expansion card 100 may ameliorate a burden on the central processing unit of the computing device by executing, in hardware, the specific application in question rather than the central processing unit executing the specific application in software, as outlined above. In some examples, the computing device may also include a memory device, which may provide a location for storing and loading corresponding software.

In some alternative examples, the computing device into which expansion card 100 is inserted may not include a conventional central processing unit. For example, this computing device may simply include a chassis that houses a rack of trays, dimensioned to receive printed circuit boards, and one or more of the printed circuit boards may include a hardware accelerator, such as hardware accelerator 104. The computing device may then provide results from the hardware accelerator across a network to which the computing devices are connected. Additionally, in some examples, the hardware accelerator may effectively replace a central processing unit or coprocessor that was previously inserted into the computing device.

In general, the computing device of the above-described system may correspond to one of a variety of different devices, such as laptops, desktops, servers, etc. In examples where the computing device represents a server, the computing device may be disposed, or located, within a data center, which may provide computational resources to users, clients, or other servers across a computing network (e.g., a wide area network). For example, the above-described system may represent a backend data center of a corporate networking enterprise that provides at least one online service to corresponding users of client devices. This online service may include a social networking service, a virtual reality service, and/or a cloud storage service. In the context of a social networking service, the specific application performed by hardware accelerator 104 may include any of the specific computing tasks described above, such as artificial intelligence inference tasks (e.g., applying a machine learning model to predict a post, interest, friend, recommendation, and/or advertisement for a user) and/or video transcoding (e.g., encoding and/or decoding) operations.

In one specific example, the computing device into which expansion card 100 is inserted may represent a domain controller server and/or an edge server. As used herein, the term "domain controller" generally refers to a server that manages a unified collection of computing resources. Additionally, the term "domain controller" may refer to a main server or primary server of a technology company data center, which may be prioritized for the processing of one or more computing tasks. In addition, as used herein, the term "edge server" generally refers to a server that resides on the "edge" between two networks. In some illustrative examples, the edge server may reside between a private network and the Internet. In some examples, an "edge server" may refer to a computing device that has fewer computing resources and/or lower computational processing power than a domain controller or main/primary server. In some examples, it may be impractical or impossible for an edge server to perform a computationally expensive computing task, such as an artificial intelligence inference task and/or a video transcoding task, without executing the computing task through a hardware accelerator, such as hardware accelerator 104 on expansion card 100, as discussed above. In other words, inserting a hardware accelerator card, such as expansion card 100, into an edge server may enable the edge server to perform the complex computing task, thereby converting the edge server from a system that is unable to efficiently or effectively perform a complex task into a system that is able to reliably handle the complex task.

In some embodiments, the computing device into which expansion card 100 is inserted may represent a multi-node compute platform. In one example, this multi-node compute platform may include a sled, which may further include one or more modular computing devices (such as a server card or a storage carrier card). In this example, one or more of the server or carrier cards may include at least one expansion socket that is dimensioned to accept expansion card 100 and to be repurposed for hardware acceleration, as discussed further below.

Figure 6:
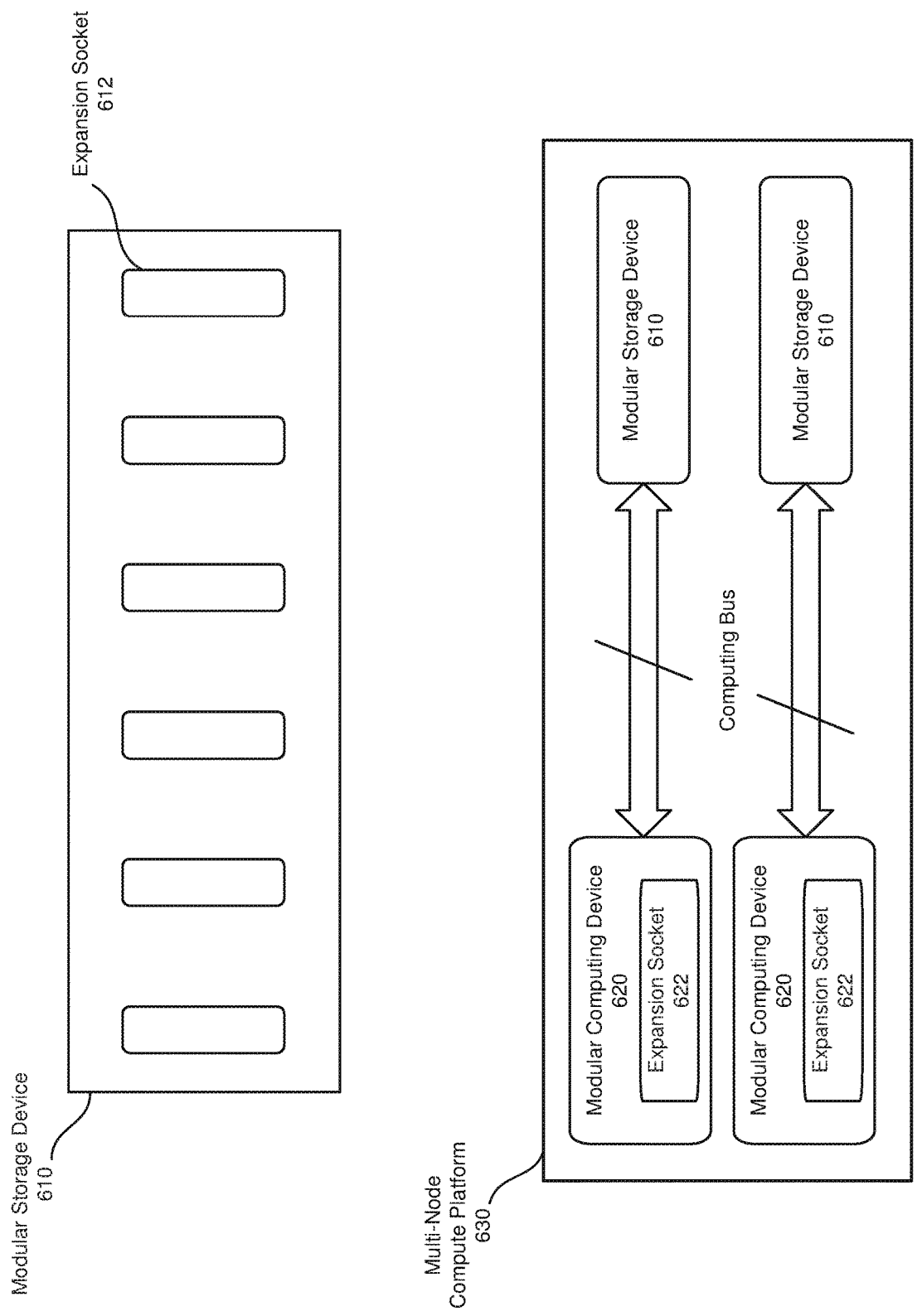
FIG. 6 is a block diagram of an example multi-node compute platform on which the expansion cards described herein may be deployed.

FIG. 6 is a block diagram of an exemplary multi-node compute platform 630 that may be partially or entirely repurposed for hardware acceleration. As shown in FIG. 6, multi-node compute platform 630 may be configured with several bays, each of which may house a modular storage device 610 (e.g., an SSD carrier card or a device carrier card), a modular computing device 620 (e.g., a micro-server card), and/or any other suitable type or form of modular node. While FIG. 6 shows multi-node compute platform 630 with four bays, multi-node compute platforms may include any other number bays.

Repurposing a multi-node compute platform for hardware acceleration may involve inserting one or more hardware accelerator expansion cards, such as expansion card 100, into a compact expansion slot within the multi-node compute platform. In the example shown in FIG. 6, hardware-accelerator expansion cards (such as expansion card 100) may be inserted into either or both of expansion sockets 622 of modular computing devices 620. Additionally or alternatively, hardware-accelerator expansion cards may be inserted into one or more of expansion sockets 612 in either or both of modular storage devices 610.

By repurposing compact expansion card sockets for hardware acceleration, embodiments of the instant disclosure may supplement multi-node compute platform 630 with hardware acceleration functionality. As such, the disclosed systems and methods may enable a data center administrator or automation system to efficiently scale the ability of a multi-node compute platform to handle computationally expensive computing tasks by simply inserting and enabling one or more hardware-acceleration expansion cards into compact expansion sockets within the multi-mode compute platform.

Figure 7:
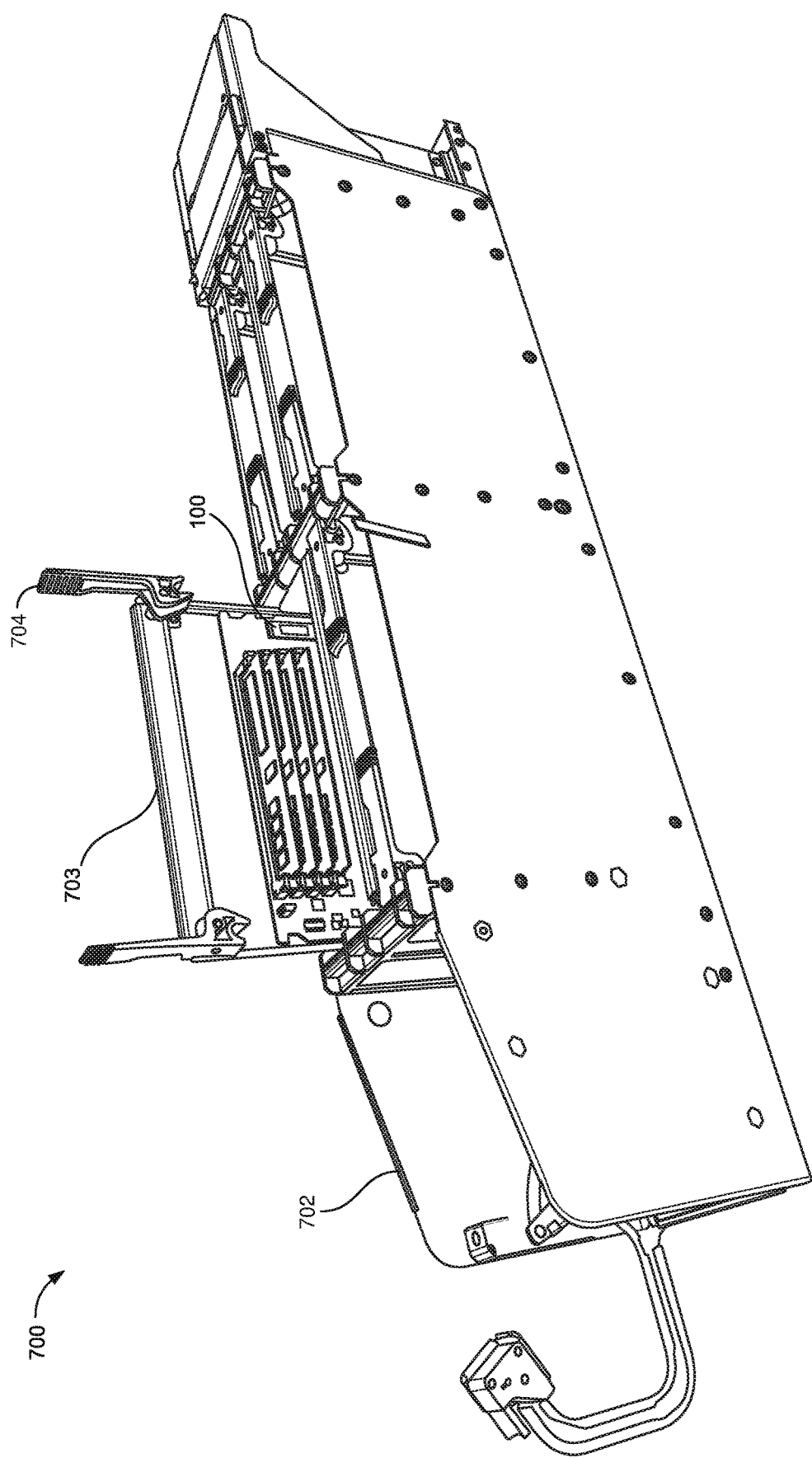
FIG. 7 is a perspective view of an example multi-node compute platform sled capable of housing the expansion cards described herein.

As noted above and illustrated in FIG. 7, a multi-node compute platform 700 may be dimensioned to accept modular computing devices on one or more sleds, such as sled 702 in FIG. 7. In this example, sled 702 may include several bays or slots for accepting corresponding trays 703, each of which may include a modular computing device (e.g., a server card) or a modular storage device (e.g., a carrier or device card, such as an SSD card). As shown in this figure, sled 702 may include four separate slots for accepting corresponding trays 703. Each tray 703 may include at least one fastening mechanism 704. FIG. 7 further illustrates how each tray 703 may hold a modular computing device and/or modular storage device, each of which may include at least one expansion socket into which expansion card 100 may be inserted.

Figure 8:
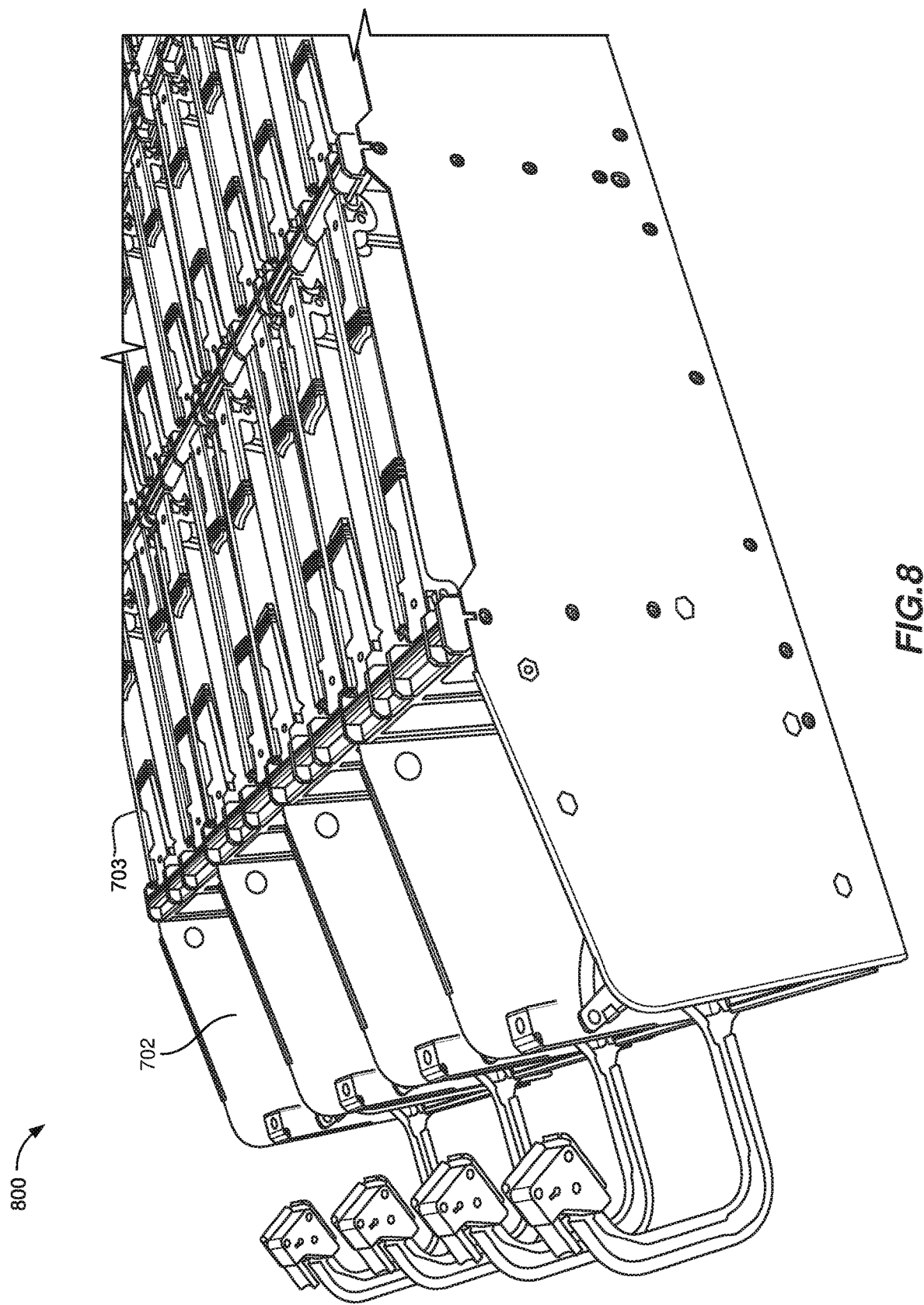
FIG. 8 is a perspective view of an example chassis capable of housing various multi-node compute platform sleds on which the expansion cards described herein may be deployed.

FIG. 8 is a perspective drawing of an expanded multi-node compute platform 800. As shown in this figure, platform 800 may include a set of sleds, such as sled 702, each of which may accept multiple trays 703 containing modular computing and/or storage devices. By repurposing compact expansion sockets in these devices, the disclosed systems and methods may facilitate dramatically improved data center scaling (e.g., scaling that may not involve adding expensive servers and/or that may not require additional space in a data center) for computationally expensive computing tasks. More specifically, data center administrators may conveniently scale hardware acceleration resources for complex tasks, such as artificial intelligence inference operations and/or video transcoding operations, by (i) adding one or more expansion cards, such as expansion card 100, to a single tray (such as tray 703) that houses a modular computing and/or storage device, (ii) adding additional trays of modular computing or storage devices to a sled (such as sled 702), each of which may include one or more instances of expansion card 100, (iii) adding additional sleds (such as sled 702) to a chassis, each of which may contain additional instances of expansion card 100, and/or (iv) adding additional chasses and/or server racks, each of which may accept multiple sleds that contain additional instances of expansion card 100.

In this manner, the disclosed systems and methods may repurpose or reengineer a multi-node compute platform, and more specifically reengineer a modular computing and/or storage device, which previously may have been used exclusively for mass storage via solid-state drives, to supplement the platform with one or more hardware accelerators. Multi-node compute platforms that are configured in this manner may benefit from the granular scalability provided by compact expansion card specifications, such as the M.2 specification. The dramatically smaller form factor of compact expansion cards may enable a larger number of expansion sockets within the same surface area in comparison to a traditional expansion card such as a PCI EXPRESS expansion card.

Figure 9:
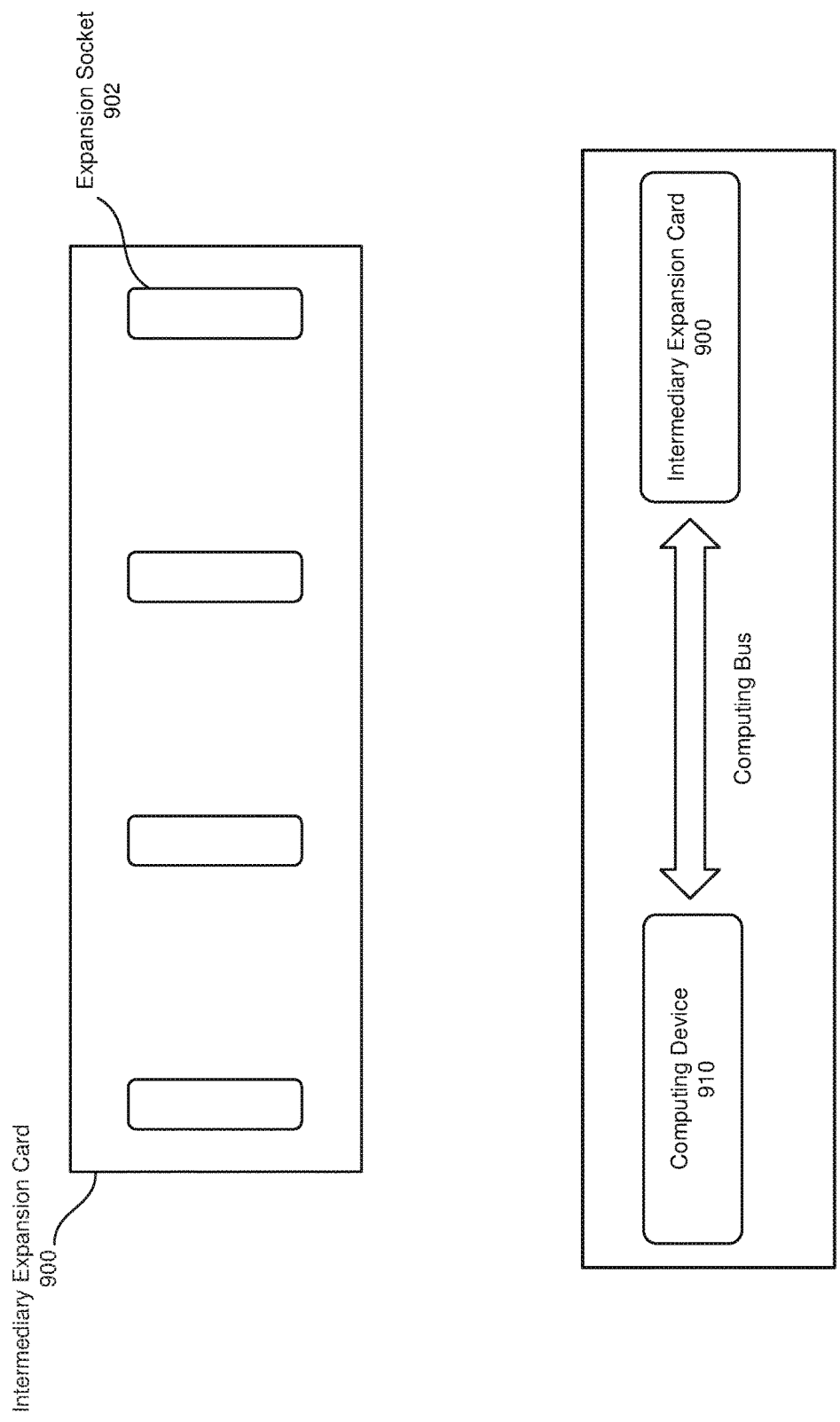
FIG. 9 is a block diagram of an example intermediary expansion card on which the expansion cards described herein may be deployed.

In some examples, the expansion socket into which expansion card 100 is inserted may be disposed on an intermediary expansion card. As used herein, the term "intermediary expansion card" generally refers to any expansion card that includes at least one expansion socket dimensioned to accept an additional expansion card in a nested fashion, as discussed further below. As shown in FIG. 9, an exemplary intermediary expansion card 900 may include two or more separate expansion sockets 902, each of which may be dimensioned to each accept an instance of expansion card 100. In the specific example of FIG. 9, intermediary expansion card 900 may include four separate expansion sockets that may each accept an instance of expansion card 100. The specific number of expansion sockets is merely illustrative, and other examples of intermediary expansion card 900 may include a fewer or greater number of expansion sockets.

In some examples, intermediary expansion card 900 may include an edge connector having a pinout that conforms to a pinout specification defined for a computing bus to which intermediary expansion card 900 is designed to be connected. For example, the pinout of the edge connector of intermediary expansion card 900 may conform to the PCI EXPRESS specification. Thus, when the edge connector of intermediary expansion card 900 is inserted into a PCI EXPRESS expansion socket on a computing device (such as computing device 910), intermediary expansion card 900 may be coupled to the PCI EXPRESS computing bus of the computing device.

In contrast, expansion card 100, which may be dimensioned to be inserted into expansion socket 902 of intermediary expansion card 900, may include an edge connector 110 that includes a pinout that is more compact than a pinout specification defined for the computing bus to which intermediary expansion card 900 is connected. For example, edge connector 110 of expansion card 100 may conform to a pinout specification defined for the M.2 standard, which is more compact than the pinout specification defined by the PCI EXPRESS standard, such that the pinout of expansion card 100 is more compact than the pinout specification of the computing bus (i.e., the PCI EXPRESS computing bus) to which expansion card 100 is ultimately connected (via intermediary expansion card 900).

Figure 10A:
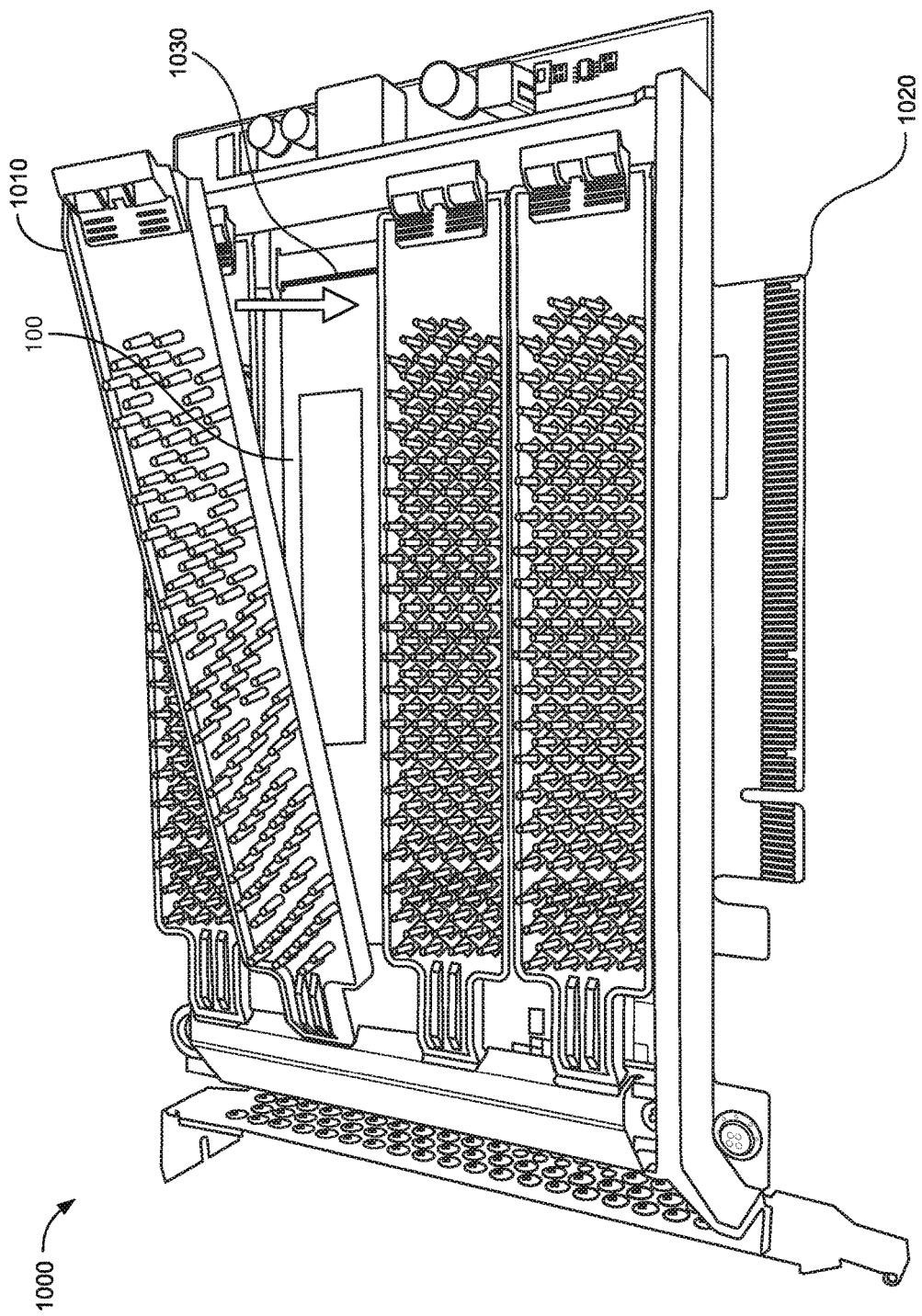
FIG. 10A is a perspective view of an example intermediary expansion card with a heatsink lifted to access a corresponding expansion card.
Figure 10B:
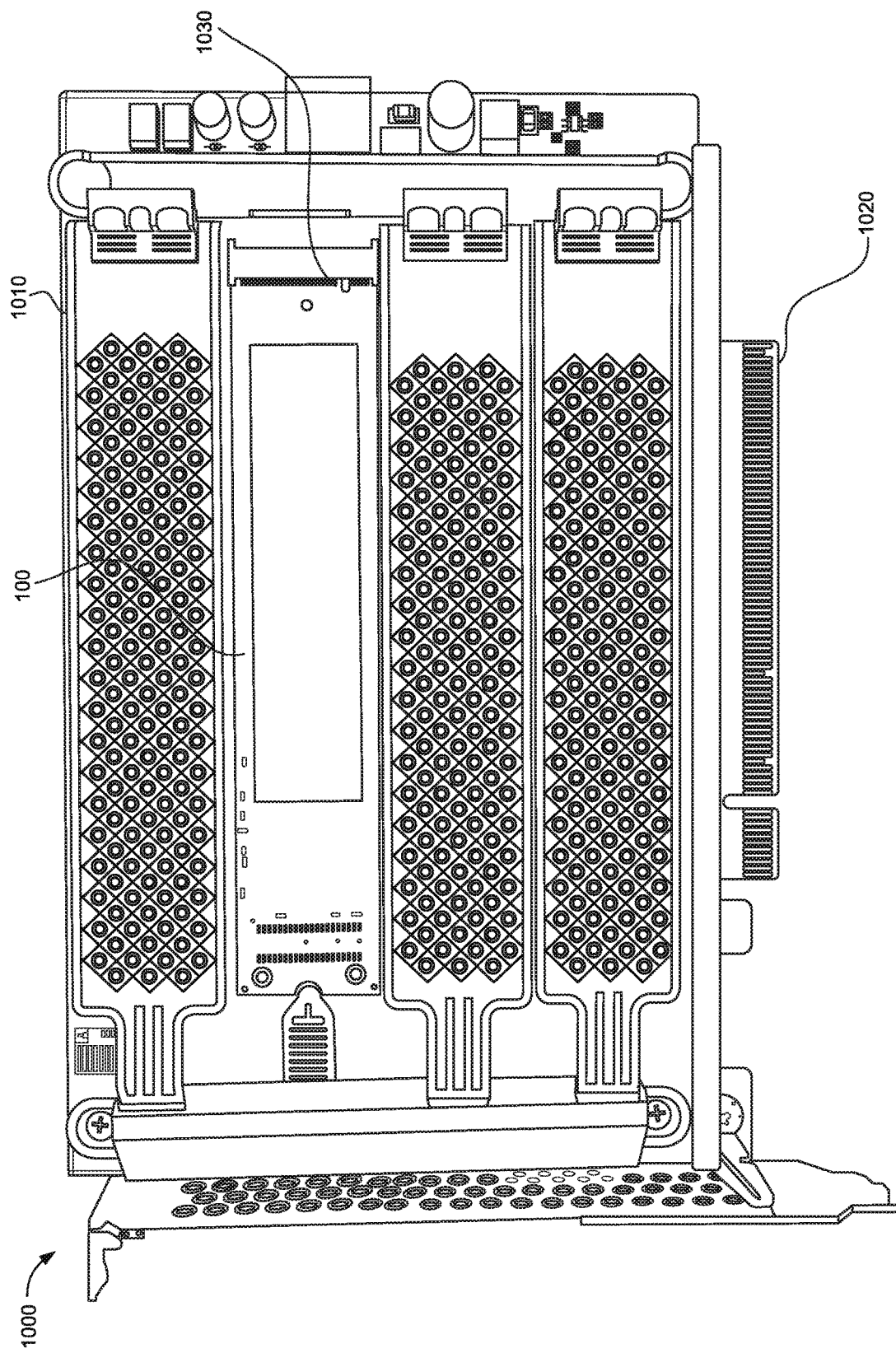
FIG. 10B is a plan view of the example intermediary expansion card of FIG. 10A in which the heatsink has been removed to access the corresponding expansion card.

FIG. 10A is a perspective view of an example intermediary expansion card 1000 that may include four separate M.2 expansion sockets for accepting four separate M.2 modules, such as instances of expansion card 100, as discussed above. As shown in this figure, intermediary expansion card 1000 may include a heatsink 1010, which may be lifted to reveal an expansion card 100, which has previously been inserted into a matching expansion socket 1030, thereby providing hardware acceleration functionality to intermediary expansion card 1000. For completeness, FIG. 10B also provides a plan view of the intermediary expansion card after heatsink 1010 has been completely removed or omitted, thereby fully revealing an example of expansion card 100, which has been secured within expansion socket 1030 of intermediary expansion card 1000. As shown in these figures, intermediary expansion card 1000 may also include an edge connector 1020, which in this example may be dimensioned or formatted according to the PCI EXPRESS pinout specification.

As first discussed above, the disclosed systems may be scaled along a variety of dimensions, including, for example, by increasing the number of instances of expansion card 100 within a computing device, increasing the number of modular computing devices or modular storage devices (each of which may contain instances of expansion card 100), increasing the number of sleds connected within the chassis of a multi-node compute platform (each of which may contain multiple modular computing and/or storage devices), and/or increasing the number of server racks or chasses within a multi-node compute platform. As such, the disclosed systems and methods demonstrate that a multi-node compute platform may be designed or retrofitted to scale by inserting and/or activating one mores expansion cards (such as expansion card 100 with hardware accelerator 104), thereby conveniently and immediately making these additional resources available to a corresponding program, service, application, and/or process.

Figure 11:
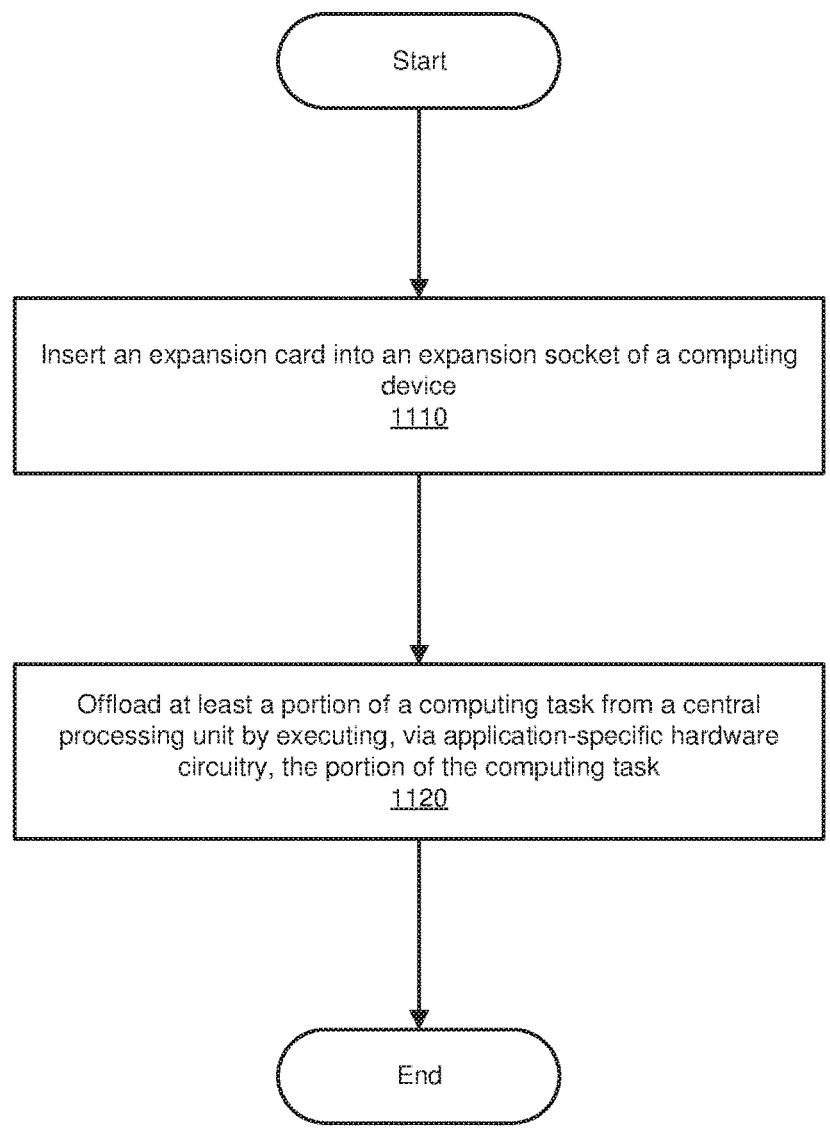
FIG. 11 is a flow diagram of an example method for performing hardware acceleration via expansion cards.

FIG. 11 is a flow diagram of an example computer-implemented method 1200 for performing hardware acceleration. The steps shown in FIG. 11 may be performed by any suitable computer-executable code and/or computing system, including the system discussed above in the context of FIGS. 6-10 and/or variations or combinations of one or more of the same. In one example, each of the steps shown in FIG. 11 may represent an algorithm whose structure includes and/or is represented by multiple sub-steps, examples of which will be provided in greater detail below.

As illustrated in FIG. 11, at step 1110, one or more of the systems described herein may insert an expansion card into an expansion socket of the computing device. For example, a data center administrator, data center robot, original equipment manufacturer, and/or automated management system may, as part of one or more of the systems shown in FIGS. 6-10, insert an expansion card 100 into an expansion socket of a computing device, such as a module within a multi-node compute platform (e.g., modular computing device 620 and/or modular storage device 610), and/or an intermediary expansion card (such as intermediary expansion card 900).

Expansion card 100 may be inserted into the computing device in a variety of ways. In general, expansion card 100 may be inserted into the computing device in a manner that parallels the insertion of expansion card 100 shown in FIGS. 5A-5C. In other words, the insertion of expansion card 100 into the computing device may involve inserting screw 504 into screw hole 508 to fixedly secure expansion card 100 against a corresponding expansion socket. Moreover, insertion of the expansion card into the computing device may involve aligning edge connector 110 with the corresponding expansion socket and then pushing or embedding edge connector 110 securely within the expansion socket. Furthermore, in the context of the embodiment of FIGS. 9, 10A, and 10B, inserting expansion card 100 into the expansion socket may further include inserting expansion card 100 into a socket, such as expansion socket 902, of an intermediary expansion card such as intermediary expansion card 900.

Moreover, in some examples, method 1100 may further include scaling hardware acceleration capabilities of the computing device by inserting an additional expansion card into an additional expansion slot of the computing device. In general, the additional expansion card may parallel the structure and/or functionality of expansion card 100. For example, the additional expansion card may include a hardware accelerator (e.g., an instance of hardware accelerator 104) that further includes application-specific hardware circuitry designed to perform the computing task. Similarly, the additional expansion card may also further include an additional edge connector that parallels edge connector 110, which is discussed further above in connection with FIGS.

4 and 5A-5C. As with edge connector 110, the additional edge connector of the additional expansion card may include a compact pinout (e.g., according to the M.2 specification) that is more compact than the pinout specification defined for the computing bus (e.g., the PCI EXPRESS computing bus specification).

As noted above, inserting the additional expansion card into the additional expansion slot to scale hardware acceleration capabilities of the computing device may be performed in a variety of ways. In some examples, scaling hardware acceleration capabilities of the computing device may simply involve inserting a single additional expansion card into a corresponding expansion socket, such as expansion socket 612 of modular storage device 610. In other examples, inserting the additional expansion card may be performed as part of a process for inserting or adding a larger component into the corresponding computing device or system. For example, in the context of FIG. 6, the additional expansion card may be added to the computing device by adding a modular storage device 610 and/or a modular computing device 620 that further includes the additional expansion card (e.g., includes the additional expansion card inserted into an expansion socket, such as expansion socket 622). Similarly, in the example of FIG. 8, scaling hardware acceleration capabilities of the computing device may further include inserting an additional sled, such as sled 702, within the corresponding chassis, or rack, of multi-node compute platform 630.

Returning to FIG. 11, at step 1120, one or more of the systems described above may offload at least a portion of the computing task from a central processing unit by executing, via application-specific hardware circuitry, the portion of the computing task. For example, hardware accelerator 104 may, as part of the system of FIGS. 6-10, offload a portion of the computing task, such as an artificial intelligence inference task and/or a video transcoding task, from a central processing unit by executing, via application-specific hardware circuitry 106, the portion of the computing task.

Hardware accelerator 104 may offload the portion of the computing task in a variety of ways. In general, hardware accelerator 104 may offload the portion of the computing task in a manner that parallels the discussion of hardware accelerator 104 above in connection with FIGS. 1, 2 and 4. More specifically, hardware accelerator 104 may perform at least a portion of the computing task itself and, therefore, alleviate one or more central processing units from the burden of performing at least a portion of the computing task. Moreover, as further discussed above, hardware accelerator 104 may perform at least a portion of the computing task in hardware, rather than performing the portion of the computing task in software, and thereby perform the portion of the computing task in a faster and more efficient manner than a central processing unit may be capable of.

In conclusion, the devices, systems, and methods discussed above in connection with FIGS. 1-11 may improve data centers or other computing environments by repurposing compact expansion card technologies to perform hardware acceleration. For example, by implementing hardware acceleration on compact expansion cards, the disclosed systems and methods may alleviate or ameliorate a burden on the central processing unit of a domain controller. Furthermore, as noted above, the disclosed hardware acceleration embodiments may enable an edge server to efficiently perform one or more computationally expensive computing tasks. Accordingly, the disclosed system and method may enable technology enterprises to better handle and adapt to expected increases in the demand for infrastructure capable of managing computationally expensive computing tasks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An expansion card comprising:
a printed circuit board;
at least one hardware accelerator, disposed on the printed circuit board, that:
  comprises application-specific hardware circuitry designed to perform a computing task; and
  offloads at least a portion of the computing task from a central processing unit of an edge server by executing, via the application-specific hardware circuitry, the portion of the computing task such that offloading the portion of the computing task enables the edge server to perform the computing task; and
an edge connector, disposed on the printed circuit board, that is dimensioned to be inserted into an expansion socket of the edge server, wherein the edge connector:
  couples the hardware accelerator to the central processing unit via a computing bus connected to the expansion socket; and
  comprises a pinout that is more compact than a pinout specification defined for the computing bus;
wherein the expansion card is configured to successfully couple with the computing bus, despite a conflict between the pinout and the pinout specification, due to the expansion socket including intermediary circuitry that effectively translates data from the pinout into a format accepted by the computing bus.

2. The expansion card of claim 1, wherein the pinout of the edge connector conforms to at least one of:
   an M.2 pinout specification;
   a U.2 pinout specification; or
   an mSATA pinout specification.

3. The expansion card of claim 1, wherein the hardware accelerator comprises at least one of:
   a field-programmable gate array; or
   an application-specific integrated circuit.

4. The expansion card of claim 1, further comprising a voltage regulator that stabilizes voltage received via the expansion socket and supplies the stabilized voltage to the hardware accelerator.

5. The expansion card of claim 1, wherein the computing task that the application-specific hardware circuitry is designed to perform comprises an artificial intelligence inference task that applies a model trained on known data to infer at least one label for new data.

6. The expansion card of claim 1, wherein the computing task that the application-specific hardware circuitry is designed to perform comprises a video transcoding task.

7. A system comprising:
   a central processing unit within an edge server;
   at least one memory device;
   at least one expansion socket; and
   at least one expansion card that comprises:
      a printed circuit board;
      at least one hardware accelerator, disposed on the printed circuit board, that:
         comprises application-specific hardware circuitry designed to perform a computing task; and
         offloads at least a portion of the computing task from the central processing unit by executing, via the application-specific hardware circuitry, the portion of the computing task such that offloading the portion of the computing task enables the edge server to perform the computing task; and
      an edge connector, disposed on the printed circuit board, that is dimensioned to be inserted into the expansion socket, wherein the edge connector:
         couples the hardware accelerator to the central processing unit via a computing bus connected to the expansion socket; and
         comprises a pinout that is more compact than a pinout specification defined for the computing bus;
      wherein the expansion card is configured to successfully couple with the computing bus, despite a conflict between the pinout and the pinout specification, due to the expansion socket including intermediary circuitry that effectively translates data from the pinout into a format accepted by the computing bus.

8. The system of claim 7, wherein the expansion socket is disposed on an intermediary expansion card that comprises a pinout that conforms to the pinout specification defined for the computing bus.

9. The system of claim 7, further comprising a chassis that is dimensioned to accept a plurality of modular computing devices, wherein the expansion socket is disposed on a modular computing device inserted into the chassis.

10. The system of claim 7, further comprising a chassis that is dimensioned to accept a plurality of modular storage devices, wherein the expansion socket is disposed on a modular storage device inserted into the chassis.

11. The system of claim 7, wherein the computing task that the application-specific hardware circuitry is designed to perform comprises an artificial intelligence inference task that applies a model trained on known data to infer at least one label for new data.

12. The system of claim 7, wherein the computing task that the application-specific hardware circuitry is designed to perform comprises a video transcoding task.

13. The system of claim 7, wherein the system comprises a domain controller.

14. The system of claim 13,
   the system comprises the edge server.

15. The system of claim 7, wherein the system comprises a backend data center of a corporate networking enterprise that provides at least one online service to corresponding users of client devices.

16. The system of claim 15, wherein the online service comprises at least one of:
   a social networking service;
   a virtual reality service; or
   a cloud storage service.

17. A method comprising:
   inserting an expansion card into an expansion socket of an edge server, the expansion card comprising:
      a printed circuit board;
      at least one hardware accelerator, disposed on the printed circuit board, that comprises application-specific hardware circuitry designed to perform a computing task; and
      an edge connector, disposed on the printed circuit board, that is dimensioned to be inserted into the expansion socket of the edge server, wherein the edge connector:
         couples the hardware accelerator to a central processing unit of the edge server via a computing bus connected to the expansion socket; and
         comprises a pinout that is more compact than a pinout specification defined for the computing bus; and
   offloading at least a portion of the computing task from the central processing unit by executing, via the application-specific hardware circuitry, the portion of the computing task such that offloading the portion of the computing task enables the edge server to perform the computing task;
   wherein the expansion card is configured to successfully couple with the computing bus, despite a conflict between the pinout and the pinout specification, due to the expansion socket including intermediary circuitry that effectively translates data from the pinout into a format accepted by the computing bus.

18. The method of claim 17, wherein the pinout of the edge connector conforms to at least one of:
   an M.2 pinout specification;
   a U.2 pinout specification; or
   an mSATA pinout specification.

19. The method of claim 17, further comprising scaling hardware acceleration capabilities of the edge server by inserting an additional expansion card into an additional expansion socket of the edge server, wherein the additional expansion card comprises:
   at least one additional hardware accelerator that comprises additional application-specific hardware circuitry designed to perform the computing task; and
   an additional edge connector that comprises an additional pinout that is more compact than the pinout specification defined for the computing bus.

20. The method of claim 17, wherein inserting the expansion card into the expansion socket comprises inserting the expansion card into a socket of an intermediary expansion card that is inserted into the expansion socket of the edge server, wherein the intermediary expansion card comprises a pinout that conforms to the pinout specification defined for the computing bus.

\* \* \* \* \*